United States Patent [19]

Kammerl

[11] Patent Number: 5,339,332
[45] Date of Patent: Aug. 16, 1994

[54] ARRANGEMENT FOR MONITORING THE BIT RATE IN ATM NETWORKS

[75] Inventor: Anton Kammerl, Groebenzell, Fed. Rep. of Germany

[73] Assignee: Siemens Aktiengesellschaft, Munich, Fed. Rep. of Germany

[21] Appl. No.: 932,684

[22] Filed: Aug. 20, 1992

[30] Foreign Application Priority Data

Aug. 27, 1991 [DE] Fed. Rep. of Germany ....... 4128411

[51] Int. Cl.$^5$ .............................................. H04Q 11/04
[52] U.S. Cl. ......................................... 375/10; 370/13; 370/94.1
[58] Field of Search ............... 375/10; 370/13, 17, 370/60, 85.6, 94.1; 371/5.1, 5.2, 5.3, 5.4, 5.5

[56] References Cited

U.S. PATENT DOCUMENTS

| | | | |
|---|---|---|---|
| 4,769,810 | 9/1988 | Eckberg, Jr. et al. | 370/60 |
| 4,849,968 | 7/1989 | Turner | 370/60 |
| 4,922,244 | 5/1990 | Hullett et al. | 370/85.6 |
| 5,007,048 | 4/1991 | Kowalk | 370/60 |
| 5,050,163 | 9/1991 | Van Baval et al. | 370/60 |
| 5,138,607 | 8/1992 | Thiebaut et al. | 370/94.1 |
| 5,179,556 | 1/1993 | Turner | 370/94.1 |

OTHER PUBLICATIONS

ACM Transactions on Computer Systems; May, 1991; No. 2, New York; Lixia Zhang—"Virtual Clock: A New Traffic Control Algorithm For Packet-Switched Networks", pp. 101–124.
NEC Research & Development, Jul., 1991, No. 3, Tokyo, Tutomu Murase et al. "Constant Bit Rate Services in ATM Networks", pp. 379–388.
International Journal of Digital and Analog Communication Systems, vol. 3, 1990, Gerd Niestegge, "The 'Leaky Bucket' Policing Method in the ATM (Asynchronous Transfer Mode) Network", pp. 187–197.
International Switching Symposium, Session A8, Paper #4, Proceedings vol. V, Erwin P. Rathget et al., "The Policing Function in ATM Networks", pp. 127–130.
Gallassi et al., "ATM: Bandwidth Assignment and Bandwidth Enforcement Policies", pp. 1788–1793, 1989.

*Primary Examiner*—Stephen Chin
*Assistant Examiner*—Timothy J. May
*Attorney, Agent, or Firm*—Hill, Steadman & Simpson

[57] ABSTRACT

For a dual leaky bucket ATM bit rate monitoring wherein the peak bit rate is monitored in a first leaky bucket unit and the maximum cell plurality of a full rate burst is declared, the duration of peak rate bursts is monitored in a second leaky bucket unit with a first counter respectively reset to 0 when the counter reading returns below a defined value. The average bit rate is monitored with a second counter having a lower response threshold, and which is incremented only with a smoothed cell rate given higher bit rates, 8 Claims, 1 Drawing Sheet

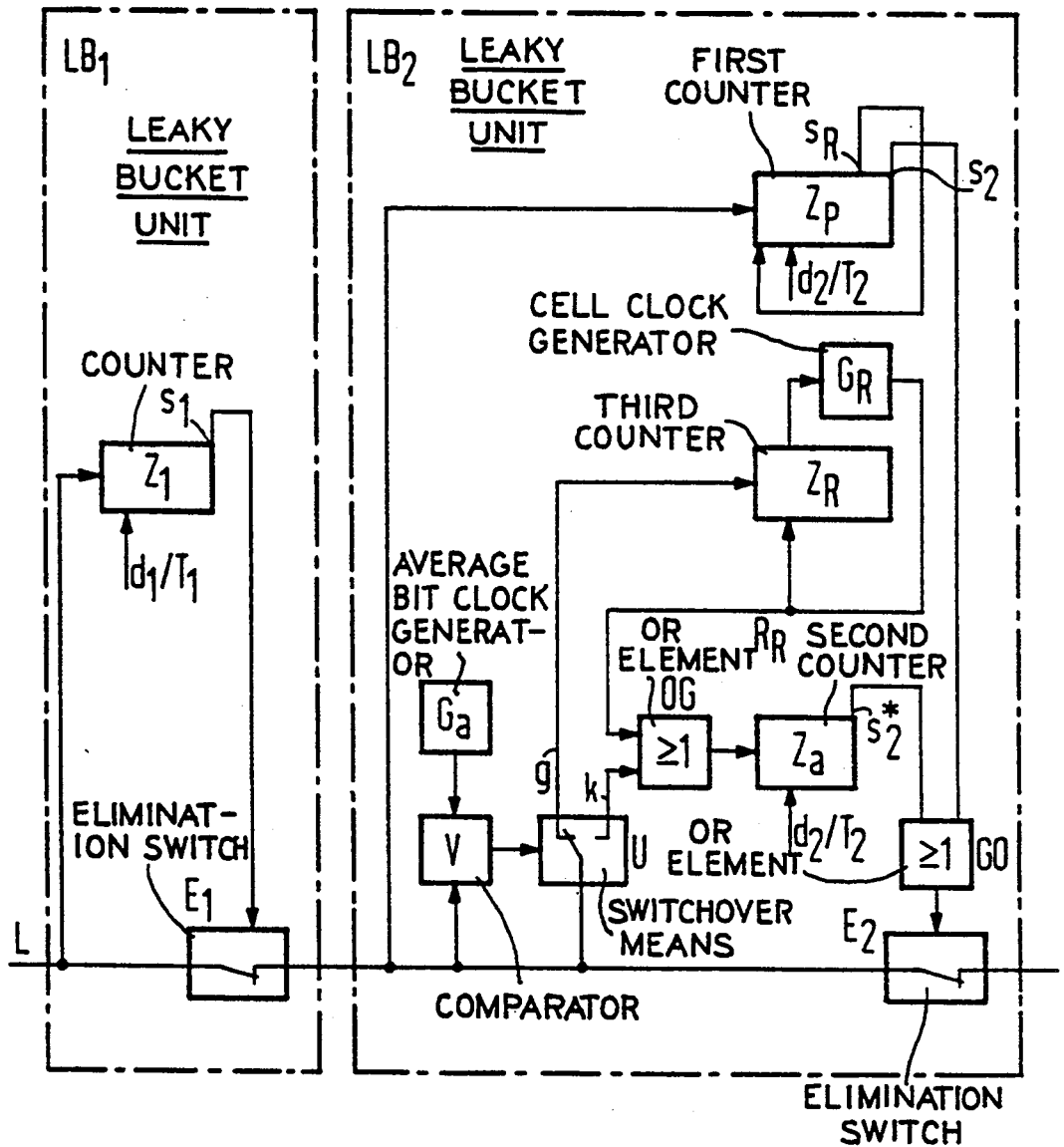

ARRANGEMENT FOR MONITORING THE BIT RATE IN ATM NETWORKS

RELATED APPLICATION

This application is related to a copending application of the same inventor entitled "ARRANGEMENT FOR MONITORING THE BIT RATE IN ATM NETWORKS", Ser. No. 07/932,561 now U.S. Pat. No. 5,295,135, and assigned to Siemens AG, the same assignee as the present application.

BACKGROUND OF THE INVENTION

In recent developments of telecommunications technology (and in the development of integrated services broadband networks (B-ISDN) in this case), the asynchronous transfer mode (ATM) based on asynchronous time-division multiplex plays a significant part. The signal transmission therein proceeds in a bit stream that is subdivided into cells (each respectively composed of a header and a useful information part) having a constant length of, for example, 52 octets that are occupied as needed with packeted messages. When no useful information is to be communicated at the moment, then specific dummy cells are transmitted. Virtual connections, i.e. connections that only in fact use a path section when a message packet (block) is in fact to be communicated thereover, are set up in ATM switching centers, whereby the header of every packet contains, among other things, an address covering, for example, 2 octets for unambiguous allocation of the packet to a specific virtual connection. Dependent on the technique of the respective selection information, every packet at the input to the switching network can obtain the complete information for its path through the switching network. With the assistance of this information, the switching elements then connect through the packet on the defined route themselves (self-routing network) (see, for example, Telcom Report 11 (1988)6, 210...213).

An ATM network offers the subscriber an extremely high maximum bit rate $r_{max}$ of, for example, 150 Mbit/s, whereby only a part of the available bit rate is often utilized by the subscriber dependent on the respective ATM service, namely in the form of the constant bit rate $r_c$ (of, for example, 2 Mbit/s) in what are referred to as CBR (constant bit rate) connections;

in the form of the average bit rate $r_a$ (of, for example, 5 Mbit/s) and of the peak bit rate $r_p$ (of, for example, 30 Mbit/s) in what are referred to as VBR (variable bit rate) connections.

During the call set up, the respectively desired traffic parameters are negotiated and potentially declared. A decision is thereby made in a call acceptance control means as to whether the momentarily available network capacity is adequate in order to set up a desired, virtual connection.

After the set up of the virtual connection, the negotiated traffic parameters are monitored in a bit rate monitoring means (policing unit). When the negotiated value is exceeded, then the excess ATM cells are eliminated. However, it is also possible to mark the excess ATM cells such that they can still be subsequently eliminated in the network as low-priority ATM cells in case traffic jams arise.

The bit rate monitoring usually occurs according to what is referred to as the leaky bucket principle (see, for example, Niestegge, the "Leaky Bucket" Policing Method in the ATM (Asynchronous Transfer Mode) Network, INTERNATIONAL JOURNAL OF DIGITAL AND ANALOG COMMUNICATION SYSTEMS, Vol. 3 (1990), 187...197). At every reception of an ATM cell, the reading of a counter is incremented by one place and (dependent on the negotiated traffic parameters), the counter reading is decremented by d places at specific intervals T. The counter reading 0 is thus neither downwardly crossed nor is a counter reading threshold s upwardly crossed. When the threshold is reached, the excess ATM cells are eliminated or marked.

When the subscriber adheres to the negotiated bit rate $4 = B_z \cdot d/T$, wherein $B_z$ is the plurality of "useful signal" bit per ATM cell, d is the decrementation value and T is the decrementation period, then the counter is always brought back to the counter reading of 0 due to the decrementation. When the subscriber exceeds the declared bit rate r, then the response threshold s is very quickly reached despite the decrementation.

Until the response threshold s is reached, the leaky bucket method allows a brief upward crossing of the declared bit rate. Proceeding from the counter reading of 0, thus s ATM cells are first allowed to pass by the leaky bucket unit in an uninterrupted sequence (i.e. without dummy cells or cells belonging to other connections) until the response threshold s of the counter is reached. When the counter reading is decremented by a value d immediately before this is reached, then further d ATM cells can pass. When the counter reading has been decremented a plurality of times before the response threshold s is reached, the plurality of ATM cells allowed to pass increases correspondingly.

The maximum possible plurality of ATM cells in what is referred to as a full-rate burst wherein the maximum bit rate of, for example, 150 Mbit/s occurs, is then $n_{max} = s + k \cdot d$ with $k = 1 \top + (s-d)/((T/t_z) - d) \bot$, wherein $t_z$ denotes the duration of an ATM cell at the maximum transmission rate and $\top \ldots \bot$ denotes that only the whole-numbered part of the expression with $\top \ldots \bot$, is relevant.

One job of the bit rate monitoring is to limit the length of such full-rate bursts because full-rate bursts increase the probability of a buffer overflow in the ATM network. For this reason, the response threshold s should be as low as possible.

Given too low a response threshold, on the other hand, it could occur that subscribers that behave properly with respect to the reported bit rate nonetheless have ATM cells eliminated without justification, namely due to waiting time jitter, i.e. variable delays arising in queues.

For example, let a variable delay δ of, for example, 0.2, ms be permitted in the line circuit area, whereby the crossing probability is allowed to be $10^{-10}$. It follows therefrom that the leaky bucket counter dare not yet have reached the response threshold s after the appearance of this delay. The counter reading of $n = s - 1$ that is just still permissible derives from the ATM cells received in the time span $\delta + T$ in the leaky bucket unit, the plurality of these ATM cells being $d = \delta \cdot r / B_z$. It is thereby then assumed that the counter reading was decremented to $n = 0$ during the delay time span δ and that (in the worst case) a decrementation event occurs immediately before the arrival of the delayed ATM cell bundle. $s = 1 + d + \top \delta \cdot r / B_z \bot$ is then valid (also see Niestegge, op. cit. eqation (6)). When s is defined in this way, then the probability of an unjustified elimination of ATM cells remains below the value $10^{-10}$. Examples of parameter value r, T, δ, s, $n_{max}$ may be found, for example, in Niestegge, op. cit., Tables I and II.

Proceeding beyond the simple leaky bucket method outlined above, policing methods are currently preferred that make use of what is referred to as a dual leaky bucket principle. For that purpose, a chain of two leaky bucket units is provided, whereby the peak bit rate $r_p = B_z \cdot d_1/T_1$ is monitored with the first leaky bucket unit and the maximum possible plurality $n_{max} = s_1 + k \cdot d_1$ of ATM cells to the response of the first leaky bucket unit, in what is referred to as a full-rate burst, is defined. Here, $B_z$ = plurality of bits per ATM cell, $d_1$ = decrementation value, $T_1$ = decrementation period of the first leaky bucket unit, $k = 1 + \top (s_1 - d_1)/((T_1/t_z) - d_1) \bot$, $s_1$ = response threshold of the first leaky bucket unit, and $t_z$ = duration of an ATM cell at the maximum transmission rate. The average bit rate $r_a = B_z \cdot d_2/T_2$ is monitored with the second leaky bucket unit, and the maximum duration $t_{max} \approx S_2 \cdot B_z/(r_p - r_a)$ of a burst with the peak bit rate $r_p$ (peak rate burst) is defined (Niestegge, op. cit., Chapter 4.2). Here, $d_2$ = decrementation value $T_2$ = decrementation period of the second leaky bucket unit, and $s_2$ = response threshold of the second leaky bucket unit.

For these jobs, the second leaky bucket unit must react inertly, or must work within an extremely high threshold $S_2$; when a service is defined, for example, with $r_a = 2$ Mbit/s, $r_p = 10$ Mbit/s and $t_{max} = 2$ s, then (given $B_z = 48 \cdot 8 = 384$) a value of approximately 40,000 derives for $s_2$. An unallowable increase in the average bit rate $r_a$ to, for example, 2.5 or 3 or 4 or 6 Mbit/s is thereby only recognized extremely late, after 32 or 16 or 8 or 4 s in the example, whereby approximately 40,000 ATM cells too many are transmitted.

What is disadvantageous, on the other hand, is a relatively frequent, unjustified elimination or marking of ATM cells at the $t_{max}$ monitoring. When the bit rate before a bit rate peak remains at the declared value $r_a$ for the average bit rate for a longer time, then the counter of the second leaky bucket unit is held roughly at the counter reading 0 due to the decrementation. During a bit rate peak of, for example, $r_p = 5 \cdot r_a$ that lasts for approximately the time span $t_{max}$, the response threshold $s_2$ be not quite reached yet. When no ATM cells arrive thereafter for some time, the counter (in a time span of approximately $5 \cdot t_{max}$) will be decremented to the counter reading 0.

When, however, another (allowed) bit rate peak occurs during this time (on average, at $2.5 t_{max}$), then the counter starts again (on average at a counter reading $s_2/2$) and then very quickly reaches the response threshold $s_2$ (on average, already after a time span of $t_{max}/2$), with the consequence that $s_2/2$ (i.e., a few thousand) ATM cells are unjustifiably eliminated or marked. The situation becomes even worse when more than 2 bit rate peaks follow one another in a short time.

SUMMARY OF THE INVENTION

It is an object of the invention to avoid the disadvantages recited above.

The invention is directed to an arrangement for bit rate monitoring in ATM networks in what is referred to as a dual leaky bucket method. The constant bit rate $r_c$ or the peak bit rate $r_p = B_z \cdot d_1/T_1$ (with $B_z$ = plurality of bits per ATM cell, $d_1$ = decrementation value and $T_1$ = decrementation period of the first leaky bucket circuit) is monitored with a first leaky bucket unit and the maximum possible plurality $n_{max} = s_1 + k d_1$ (with $k = 1 + \top (s_1 - d_1)/((T_1/t_z) - d_1) \bot$, $s_1$ = response threshold of the first leaky bucket unit, $t_z$ = duration of an ATM cell at the maximum transmission rate) of ATM cells up to the response of the first leaky bucket unit in what is referred to as a full-rate burst is defined, or the average bit rate $r_a = B_z \cdot d_2/T_2$ (with $d_2$ = decrementation value and $P_2$ = decrementation period of the second leaky bucket unit) is monitored with a second leaky bucket unit and the maximum duration $t_{max} \approx S_2 \cdot B_z/(r_p - r_a)$ of a peak rate burst (with $s_2$ = response threshold of the second leaky bucket unit) is defined. A reset threshold upon whose downward crossing the counter is reset to the counter reading of 0 and that lies shortly before the response threshold is effective in the second leaky bucket unit at the counter having the response threshold $s_2$ that is decremented with the ATM cells arriving in the second leaky bucket unit, and is respectively decremented by the decrementation value $d_2$ with the decrementation period $T_2$. In addition to this first counter, a second counter that is incremented with the ATM cells arriving in the second leaky bucket unit with a bit rate $r \leq r_a$ and respectively decremented by the decrementation value $d_2$ with the decrementation period $T_2$. This has a lower response threshold $s_2$ than the first counter which, when reached, leads to an elimination or marking of the excess ATM cells (in the same way as when the response threshold of the first counter is reached). A third counter incremented with the ATM cells arriving in the second leaky bucket unit with a bit rate $r > r_a$ and decremented with a smoothed, lower cell clock rate is provided. The decrementation signal thereof simultaneously increments the afore-mentioned, second counter.

The invention offers the advantage in the second leaky bucket unit of being able to take a correspondingly long allowable duration $t_{max}$ of peak rate bursts into consideration with a high response threshold $s_2$ without unjustified elimination or marking of ATM cells of peak rate bursts following closely upon one another, and to also relatively quickly identify an inadmissible upward crossing of the declared average bit rate $r_a$ and to be able to avoid a transmission of excess ATM cells.

In order to thereby make non-adherence to declared connection parameters more difficult for a subscriber, the counter can be reset to a higher counter reading in a further development of the invention given a repeated downward crossing of the reset threshold effective at the first counter. Given a multiply repeated downward crossing of the reset threshold, the counter can also be reset to respectively increasingly higher counter readings.

The clock rate with which the second counter is incremented and with which the third counter is decremented can be the same as the cell rate corresponding to the average bit rate $r_a$. However, it is also possible that the clock rate is higher than the cell rate corresponding to the average bit rate $r_a$ and is lower than the cell rate corresponding to the peak bit rate $r_p$, particularly lower than the cell rate corresponding to half ($r_p/2$) of the peak bit rate. It is also possible that the cell clock rate is set dependent on the value of the counter reading of the third counter such that it corresponds to the average bit rate given a low counter reading, corresponds to a bit rate between the average bit rate and the peak bit rate given a higher counter reading, and corresponds to the peak bit rate given an extremely high counter reading.

BRIEF DESCRIPTION OF THE DRAWINGS

The drawing is a schematic diagram of the system of the invention for monitoring bit rates in ATM networks.

DESCRIPTION OF THE PREFERRED EMBODIMENTS

With scope necessary for an understanding of the invention, the drawing schematically shows a policing arrangement having a chain of two leaky bucket units $LB_1$, $LB_2$ that, given upward crossing of declared parameters, effect an elimination of excess ATM cells with the assistance of two corresponding elimination means $E_1$, $E_2$ that are shown in the drawing as switches introduced into a line L carrying the ATM cells.

Let the peak bit rate $r_p = B_z \cdot d_1/t_1$ ($B_z$ = plurality of bits per ATM cell, $d_1$ = decrementation value and $T_1$ = decrementation period of the first leaky bucket unit) thereby be monitored with the first leaky bucket unit $LB_1$ and let the maximum possible plurality $n_{max} = s_1 + k \cdot d_1$ (with $k = 1 + T(s_1 - d_1)/((T_1/t_z) - d_1) \perp$, $s_1$ = response threshold of the first leaky bucket unit, $t_z$ = duration of an ATM cell given the maximum transmission rate) of ATM cells up to the response of the first leaky bucket unit be declared in what is referred to as a full-rate burst. It is indicated in the drawing for this purpose that the first leaky bucket unit $LB_1$ comprises a counter $Z_1$ whose counter reading is incremented by the ATM cells appearing on the cell line L and is repeatedly decremented by a respective decrementation value $d_1$ with a decrementation period $T_1$ processing from a decrementation input $d^1/T^1$. When the response threshold $s^1$ is reached, the counter $Z^1$ outputs an eliminaiton instruction to the elimination means $E_1$ proceeding from a corresponding output $s_1$.

The average bit rate $r_a = B_z \cdot d_2/T_2$ (with $d_2$ = decrementation value and $T_2$ = decrementation period of the second leaky bucket unit) is monitored with the second leaky bucket unit, and the maximum duration $t_{max} \approx s_2 \cdot B_z/(r_p - r_a)$ of a (so-called peak rate) burst having the peak bit rate is declared (with $s_2$ = response threshold of the second leaky bucket unit). It is indicated for this purpose in the drawing that the second leaky bucket unit $LB_2$ comprises a counter $Z_p$ whose counter reading is incremented by the ATM cells that still appear on the cell line L after passing the leaky bucket unit $LB_1$ and which is repeatedly decremented by a respective decrementation value $d_2$ with a decrementation period $T_2$ proceeding from a decrementation input $d_2/T_2$. When a response threshold $s_2$ is reached, the counter $Z_p$ outputs an elimination instruction to the elimination means $E_2$ proceeding from a corresponding output $s_2$.

As also indicated in the drawing, a reset threshold $s_R$ that lies shortly before the response threshold $s_2$ is effective at the counter $Z_p$, and the counter $Z_p$ is reset to the counter reading 0 proceeding from a corresponding output $s_R$ when this reset threshold $s_R$ is downwardly crossed. It is also possible that (given a repeated downward a crossing of the reset threshold $s_R$ effective at the counter $Z_p$), the counter $Z_p$ is not reset to the counter reading 0, but only to a higher counter reading, whereby the counter $Z_p$ can also be reset to respectively increasingly higher counter readings given a multiply repeated downward crossing of the reset threshold $s_R$. Without this being shown in greater detail in the drawing, the reset threshold output $s_R$ of the counter $Z_p$ can also lead to corresponding, additional reset inputs of the counter $Z_p$ for this purpose via a step-by-step means controlled proceeding from the output $s_R$.

The maximum duration $t_{max}$ of peak rate bursts is monitored in the second leaky bucket unit $LB_2$ in the above-recited way with the assistance of the counter $Z_p$.

For monitoring the average bit rate $r_a$, a second counter $Z_a$ is provided in the second leaky bucket unit $LB_2$ in addition to this first counter $Z_p$, this second counter $Z_a$ having a lower response threshold $s^*_2$ than the first counter $Z_p$. When this lower response threshold $s^*_2$ is reached an elimination or marking of the excess ATM cells occurs, in the same way as when the response threshold $s_2$ of the first counter $Z_p$ is reached. It is indicated for this purpose in the drawing that the corresponding counter output $s_2$ (at the first counter $Z_p$) and $s^*_2$ (at the second counter $Z_a$) lead to the control input of the elimination means $E_2$ via an OR element GO.

As may also be seen from the drawing, the second counter $Z_a$ is also repeatedly decremented by the respective decrementation value $d_2$ with the decrementation period $T_2$ proceeding from a corresponding decrementation input $d_2/T_2$. The counter reading of the second counter $Z_a$ is incremented, first, with those ATM cells arriving in the second leaky bucket unit $LB_2$ whose bit rate does not exceed the average bit rate $r_a$. It is indicated for this purpose in the drawing that the ATM cell line L is connected to the counting input of the second counter $Z_a$ via the output k of a switch-over means U and via a following OR element OG. The switch-over means U can be driven proceeding from a bit rate comparator V for this purpose, this being connected, first, to the ATM cell line L and, second, to an average bit clock generator $G_a$.

The lower response threshold $s^*_2$ of the second counter $Z_a$ allows an impermissible elevation in the average bit rate $r_a$ to already be recognized correspondingly early. In order to avoid the lower response threshold $s^*_2$ being reached unjustifiably early, those ATM cells that arrive in the second leaky bucket unit $LB_2$ with a bit rate exceeding the average bit rate $r_a$ are thereby not directly employed for incrementing the second counter $Z_a$. On the contrary, a third counter $Z_R$ is also provided, the counter reading thereof being incremented with the ATM cells arriving in the second leaky bucket unit $LB_2$ with a bit rate $r > r_a$. It is incremented proceeding from the other output g of the switch-over means U. This third counter $Z_R$ is decremented with a smoothed, i.e. regularly lower cell clock rate $R_R$. As likewise indicated in the drawing, this can occur with the assistance of a corresponding cell clock generator $G_R$ which, controlled proceeding from the counter $Z_R$, repeatedly supplies a corresponding decrementation signal to the counter $Z_R$ with the smoothed cell clock rate $R_R$. The counter reading of the afore-mentioned, second counter $Z_a$ is simultaneously incremented with this decrementation signal of the third counter $Z_R$, this being indicated in the drawing by an appropriate connection $R_R$ leading to the second input of the OR element OG that proceeds the counting input of the second counter $Z_a$.

The cell clock rate $R_R$ can thereby be equal to the ATM cell rate corresponding to the average bit rate $r_a$. However, it is also possible that the cell clock rate $R_R$ is higher than the cell rate corresponding to the average bit rate $r_a$ and is lower than the cell rate corresponding to the peak bit rate $r_p$. Particularly, it is less than the cell rate corresponding to half the peak bit rate. Furthermore, it is possible that the smoothed cell clock rate $R_R$ is set based on the value of the counter reading of the third counter $Z_R$ such that it corresponds to the average bit rate $r_a$ given a low counter reading, corresponds to a bit rate between the average bit rate $r_a$ and the peak bit rate $r_P$ given a higher counter reading, and corresponds to the peak bit rate $r_p$ given an extremely high counter reading.

In conclusion, let it also be pointed out that both the duration $t_{max}$ of peak rate bursts as well as the average bit rate $r_a$ are monitored in the second leaky bucket unit $LB_2$ in the exemplary embodiment shown in the drawing but that it is also alternatively possible to monitor only the duration $t_{max}$ of peak rate bursts or only the average bit rate $r_a$, whereby (in a modification of the illustration in the drawing) the OR element GO and the counter circuit ($Z_a$ with $Z_R$; $Z_p$) leading to the one or to the other input thereof are then eliminated.

Although various minor changes and modifications might be proposed by those skilled in the art, it will be understood that I wish to include within the claims of the patent warranted hereon all such changes and modifications as reasonably come within my contribution to the art.

I claim as my invention:

1. A system for bit rate monitoring in an ATM network, comprising:

first leaky bucket means for monitoring a peak bit rate $r_p = B_Z \cdot d_1/T_1$, where $B_Z$ = plurality of bits per ATM cell, $d_1$ = decrementation value and $T_1$ = decrementation period of the first leaky bucket means, and defining for a full-rate burst a maximum possible plurality $n_{max} = s_1 + kd_1$ of ATM cells up to a response of the first leaky bucket means, where $k = 1 + \top (s_1 - d_1)/((T_1/t_z) - d_1) \bot$, $s_1$ = response threshold of the first leaky bucket means and $t_z$ = duration between beginning of a first bit and end of a last bit of an ATM cell at a maximum transmission rate;

second leaky bucket means having an ATM Cell input connected to an ATM cell output Of the first leaky bucket unit means for monitoring an average bit rate $r_a = B_Z \cdot d_2/T_2$, where $d_2$ = decrementation value and $T_2$ = decrementation period of the second leaky bucket means, and defining a maximum duration $t_{max} = s_2 \cdot B_Z/(r_p - r_a)$ of a peak rate burst where $s_2$ = response threshold of the second leaky bucket means;

said second leaky bucket means having first, second, and third counter means;

said first counter means having said response threshold $s_2$ and also a reset threshold $s_R$ for resetting the first counter means to zero upon a downward crossing of the reset threshold $S_R$, said reset threshold $s_R$ lying a few counting steps before said response threshold $s_2$, said response threshold $s_2$ having a counter reading which is incremented with ATM cells arriving at said input of said second leaky bucket means, and being decremented by said decrementation value $d_2$ with said decrementation period $T_2$;

said second counter means being connected to be incremented with the ATM cells arriving in the second leaky bucket unit means with a bit rate $r < r_a$ and decremented by said decrementation value $d_2$ with the decrementation period $T_2$, said second counter means having a lower response threshold $s^*_2 < s_2$ than said first counter means, said lower response threshold when reached providing an output for elimination or marking of excess ATM cells;

means for elimination or marking of the excess ATM cells, said means being connected to said lower response threshold $s_2$ output from said first counter means; and said third counter means being incremented with the ATM cells arriving in the second leaky bucket unit with a bit rate $r > r_a$ and decremented with an output from a cell clock generator means for providing a smoothed, lower cell clock rate $R_R$, said smoothed, lower cell clock rate $R_R$ also being connected to simultaneously increment said second counter means.

2. A system according to claim 1 wherein given a repeated downward crossing of said reset threshold $s_R$ in said first counter means, said first counter means is reset only to a higher counter reading.

3. A system according to claim 2 wherein given multiply repeated downward crossings of said reset threshold $s_R$, said first counter means is reset to increasingly higher counter readings.

4. A system according to claim 1 wherein said smoothed cell clock rate $R_R$ is equal to a cell rate corresponding to said average bit rate $r_a$.

5. A system according to claim 1 wherein said smoothed cell clock rate $R_R$ is higher than a cell rate corresponding to said average bit rate $r_a$ and lower than a cell rate corresponding to said peak bit rate $r_p$.

6. A system according to claim 5 wherein said smoothed cell clock rate $R_R$ is lower than a cell rate corresponding to half ($r_p/2$) of said peak bit rate $r_p$.

7. A system according to claim 1 wherein said smoothed cell clock rate $R_R$ is set in accordance with a counter reading of the third counter such that the cell clock rate $R_R$ 1) is the same at least in order of magnitude as the average bit rate up to a first counter reading limit,
   2) is equal to a bit rate between the average bit rate and the peak bit rate from the first counter reading limit up to a second counter reading limit, and
   3) is equal at least in order of magnitude to the peak bit rate after the second counter reading limit.

8. A system according to claim 1 wherein only a maximum duration $t_{max}$ of a peak rate burst or said average bit rate $r_a$ is monitored with said second leaky bucket means.

* * * * *